United States Patent
Usui et al.

(10) Patent No.: US 9,234,580 B1
(45) Date of Patent: Jan. 12, 2016

(54) CONTROL DEVICE FOR AN AUTOMATIC TRANSMISSION OF A BICYCLE

(71) Applicant: Shimano Inc., Sakai-shi, Osaka (JP)

(72) Inventors: Makoto Usui, Sakai (JP); Junya Fujita, Sakai (JP); Yasuhiro Tsuchizawa, Sakai (JP)

(73) Assignee: Shimano Inc., Sakai-shi (JP)

( * ) Notice: Subject to any disclaimer, the term of this patent is extended or adjusted under 35 U.S.C. 154(b) by 0 days.

(21) Appl. No.: 14/724,759

(22) Filed: May 28, 2015

(51) Int. Cl.
*B62M 9/123* (2010.01)
*F16H 61/02* (2006.01)
*F16H 59/14* (2006.01)
*F16H 59/52* (2006.01)
*F16H 59/44* (2006.01)

(52) U.S. Cl.
CPC ............ *F16H 61/0213* (2013.01); *B62M 9/123* (2013.01); *F16H 59/14* (2013.01); *F16H 59/44* (2013.01); *F16H 59/52* (2013.01); *F16H 2059/142* (2013.01); *F16H 2061/0223* (2013.01); *F16H 2061/0234* (2013.01); *F16H 2061/0244* (2013.01)

(58) Field of Classification Search
None
See application file for complete search history.

(56) References Cited

U.S. PATENT DOCUMENTS

| 6,047,230 A | * | 4/2000 | Spencer | ................. B62M 9/123 474/70 |
| 2009/0164076 A1 | * | 6/2009 | Vasiliotis | ............... B62M 11/16 701/55 |
| 2012/0130603 A1 | * | 5/2012 | Simpson | ................ B62M 9/123 701/51 |

* cited by examiner

*Primary Examiner* — Erin D Bishop
(74) *Attorney, Agent, or Firm* — Alleman Hall McCoy Russell & Tuttle LLP (57) ABSTRACT

A control device for an automatic transmission for a bicycle is provided. The control device comprises a controller configured to instruct the automatic transmission to shift among a plurality of speed stages, each speed stage having an associated cadence range, wherein the controller is further configured to determine a traveling resistance of the bicycle, and if the traveling resistance exceeds a predetermined threshold, the controller is configured to adjust at least one of the cadence ranges, and following the adjustment of the at least one cadence range, the controller is further configured to operate the automatic transmission to shift based upon the adjusted cadence range and a detected cadence.

15 Claims, 10 Drawing Sheets

CONTROL DEVICE FOR AN AUTOMATIC TRANSMISSION OF A BICYCLE

BACKGROUND

Many bicycles include manually shifted drivetrains having one or more derailleurs and sprockets. The derailleurs cause a chain to move between the sprockets in the drivetrain. The derailleurs are manually shifted via shifting mechanisms mounted on the handlebars or other rider accessible locations on the bicycle. Thus, the rider has to initiate shifting input to alter the gear ratio in the bicycle. This type of manual shifting input can be difficult to master for both inexperienced and experienced riders. A rider may not actuate the manual shifting controls with the proper force, timing, or direction, and as a result the rider's intended shifting operation may not be timely or properly executed. As a result, in inefficient gear ratio may result, and the rider's pedaling efficiency may suffer.

Automatic drivetrains have been developed for bicycles to eliminate the need for a rider to shift, increasing pedaling efficiency and simplifying bicycle operation. However, prior automatic drivetrains may only take into account a bicycle's cadence when determining a selected speed stage (e.g., gear ratio) in the drivetrain. Other factors including various resistances imparted to the bicycle, such as rolling resistances, drivetrain resistances, gravitational force, etc., can also affect pedaling efficiency and shifting performance.

SUMMARY

According to a first aspect of the invention, a control device for an automatic transmission for a bicycle is provided. The control device may include a controller configured to instruct the automatic transmission to shift among a plurality of speed stages, each speed stage having an associated cadence range. The controller may be further configured to determine a traveling resistance of the bicycle. If the traveling resistance exceeds a predetermined threshold, the controller may be configured to adjust at least one of the cadence ranges, and following the adjustment of the at least one cadence range, the controller may be further configured to operate the automatic transmission to shift based upon the adjusted cadence range and a detected cadence. One potential advantage of such a configuration is that by taking into account traveling resistance when performing shifting operation speed stages can be selected that improve pedaling efficiency and avoid jarring shifting operation during periods of high rider toque input, for example.

In the first aspect, the controller may be configured to receive sensor inputs from at least one of a bicycle speed sensor, a crank rotation speed sensor, and a cadence sensor, and compute the traveling resistance based upon the sensor inputs. One potential advantage of such a configuration is that the traveling resistance can be determined based on a variety of sensor inputs to increase the reliability as well as accuracy of the traveling resistance computation, to improve shifting operation.

In the first aspect, the controller may be configured to compute the traveling resistance according to the formula:

$$\int T\times N dt-\frac{1}{2}m(v_2-v_1)^2$$

wherein

T=torque;
N=number of crankshaft rotations (per unit time);

m=mass of the bicycle and a rider; and v=bicycle speed.

One potential advantage using the aforementioned equation to calculate traveling resistance is that traveling resistance can be accurately determined.

In the first aspect, the controller may be further configured to: in a first shift mode, determine a speed stage based upon the detected cadence, from among a plurality of speed stages each having an associated cadence range; and in a second shift mode, determine a speed stage based upon the detected traveling resistance and the detected cadence. One potential advantage of such a configuration is that the travelling resistance can be taken into account when selecting a speed stage only when desired which can improve shifting operation and increase pedaling efficiency, for instance.

In the first aspect, the first shift mode may be a normal mode which is applied when the traveling resistance does not exceed the predetermined threshold, and the second shift mode may be a high load mode which is applied when the traveling resistance exceeds the predetermined threshold. One potential advantage of using threshold values to determine a selected shift mode is that it enables traveling resistance to be used only when it may have a noticeable effect on pedaling efficiency, to improve bicycle operation, for instance.

In the first aspect, the cadence ranges for at least two of the speed stages may be the same or overlap. One potential advantage of using similar or overlapping speed stages may be to provide a smooth shifting operation which has a less abrupt transitional movement, for example.

In the first aspect, in the first shift mode, the cadence range for at least one of the speed stages may be determined based upon a target cadence. One potential advantage of using a target cadence, is that it enables a rider to pedal within a desired cadence range to increase pedaling efficiency, reduce rider fatigue, and decrease the likelihood of pedaling injuries.

In the first aspect, in the first shift mode, the target cadence may programmable by a user. One potential advantage of such a configuration is that a rider can adjust the target cadence according to the rider's preference, increasing the control device's adaptability and customer satisfaction.

In the first aspect, the controller may be further configured to initiate a speed stage skipping mode in which a temporary cadence range may be set to be larger than the cadence range in the first shift mode and if the cadence becomes outside of the temporary cadence range in the speed stage skipping mode, the controller may initiate the first shift mode again when the controller does not initiate the second shift mode. One potential advantage of such a configuration is that unwanted shifting operation (e.g., abrupt and jarring shifting transition causing noise and vibration) may be avoided to improve shifting operation, for instance.

In the first aspect, the controller may further be configured to initiate a stop mode when a bicycle speed is detected to be substantially zero, and wherein in the stop mode the cadence range may be set to be a predetermined cadence range associated with the speed stage. One potential advantage of such a configuration is that a desired speed stage can be set when the bicycle is stopped to enable a rider to pedal at a desired cadence from rest without exerting undue torque, for example.

In the first aspect, the controller may be further configured to initiate a high load mode when input energy meets or exceeds a predetermined threshold. One potential advantage of such as configuration is that the high load can be initiated when a rider is overexerting themselves, to reduce pedaling fatigue and improve pedaling efficiency.

In the first aspect, the controller may be further configured to detect a transition cadence at the time of transition to the high load mode, and configured to adjust the cadence range to have a lower limit that is lower than the detected transition cadence and an upper limit that is higher than the detected transition cadence when the detected transition cadence is greater than a lower limit of the cadence range for a current speed stage. One potential advantage of such a configuration is that unwanted shifting during a mode transition can be avoided, to improve shifting operation, for example.

In the first aspect, the controller may be further configured to detect a transition cadence at the time of transition to the high load mode, and may be configured to adjust the cadence range to have a lower limit that is lower than a current lower limit of the cadence range for a current speed stage and an upper limit that is higher than a current upper limit of the cadence range when the detected transition cadence is less than or equal to the lower limit of the cadence range for the current speed stage. One potential advantage of such a configuration is that unwanted shifting during a mode transition can be avoided, to improve shifting operation, for example.

In the first aspect, when the detected cadence falls below a lower limit of an adjusted cadence range in the high load mode, the controller may be configured to determine whether a downshift is possible, and if possible, to command a downshift operation; and wherein the controller may be further configured to inhibit a downshift operation if the controller does not initiate the high load mode and if a current speed stage is equal to or smaller than a predetermined minimum downshift speed stage. One potential advantage of such as configuration is that a downshift can be selectively implemented by the control device when needed to provide desirable shifting characteristics.

In the first aspect, the predetermined minimum downshift speed stage may be determined according to a user setting. One potential advantage of such a configuration is that a rider can adjust the minimum downshift speed stage according to their predilection, increasing the control device's adaptability and customer satisfaction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1:
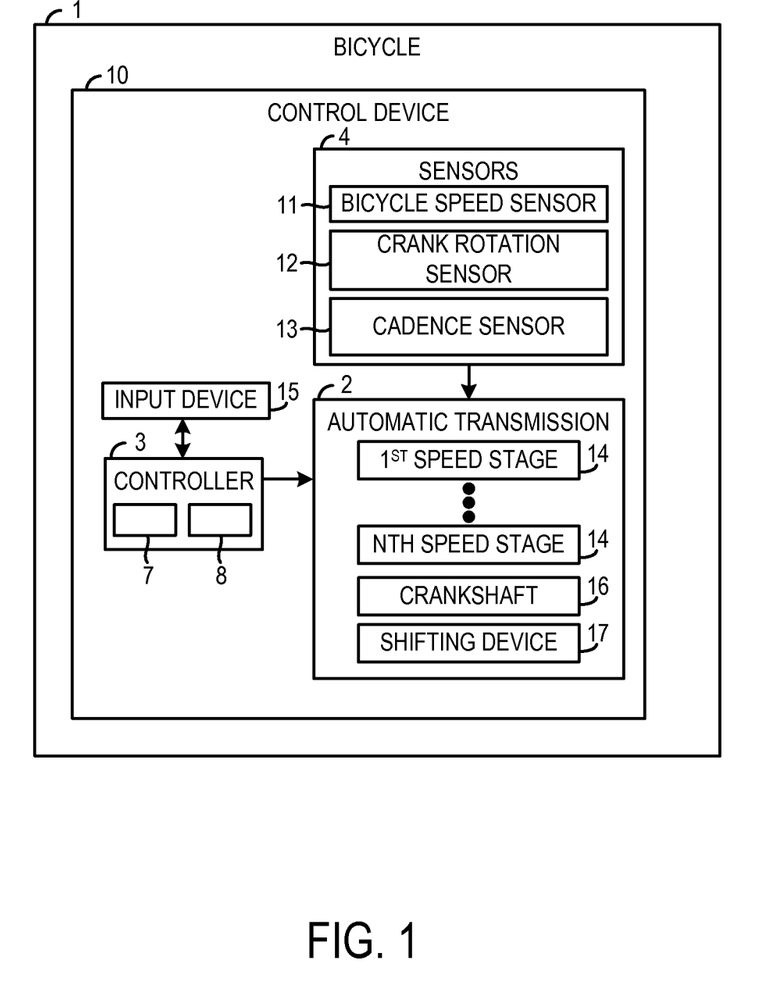
FIG. 1 shows a schematic view of an example bicycle with a hub assembly according to a first embodiment of the present invention.

Referring initially to FIG. 1 a bicycle 1 includes a control device 10. The control device 10 may include an automatic transmission 2, a controller 3, and one or more sensor(s) 4. The automatic transmission 2 may include a plurality of speed stages 5 and an input device 6. The speed stages 5 may have an associated cadence ranges. The controller 3 may be configured to instruct the automatic transmission 2 to shift among a plurality of speed stages. In one example, each of the speed stages 5 may have an associated and predetermined gear ratio. For instance, each of the speed stages may have a corresponding front and rear sprocket ratio. However, in other example the automatic drivetrain may include continuously adjustable gears, or internal hub gears.

The controller 2 may include instructions stored in memory 7 executable by a processor 8 to perform the methods described herein. The sensor(s) 4 may include at least one of a bicycle speed sensor 11, a crank rotation sensor 12, and a cadence sensor 13. In this way, variables such as bicycle speed, crank speed, and bicycle cadence can be detected for subsequent calculations, such as the bicycle's traveling resistance, for instance.

The automatic transmission 2 may include a plurality of speed stages 14. A speed stage is defined as a specific gear ratio for the bicycle's automatic transmission. In one example, the speed stages may be discrete. That is to say that there is a plurality of predetermined gear ratios, in such an embodiment. However, in other embodiments there may be a plurality of continuous speed stages.

In one exemplary embodiment a speed stage may include a selected front chain-ring and a selected rear sprocket in a sprocket set (e.g., cassette). However, other speed stage configurations have been contemplated. For instance, the speed stages may be selected from a continuous variable transmission component or an internal gear hub, or the bicycle may only include variable sprockets in the front and/or rear of the transmission, for example.

The control device 10 may also include an input device 15. The input device 15 may include buttons, a touch sensitive device (e.g., touch pad, touch screen), a display, etc., that enables a rider to select various settings in the automatic transmission such as a predetermined minimum downshift speed stage, a target cadence, etc., described in greater detail herein. Thus, the predetermined minimum downshift speed stage and/or target cadence may be programmable by a user. In this way, some of the variables used for in the automatic shifting techniques described in greater detail herein can be user selected to provide rider customization of the automatic shifting operation. Consequently, rider satisfaction may be increased. The input device 15 provides a manual shift signal to the controller when it is operated. The automatic transmission is basically automatically controlled by the controller 3. However when the controller 3 receives a shift signal from the input device 15, the controller controls the automatic transmission based on the shift signal temporally. Further in other embodiments the input device 15 may be integrated into a component in the control device such as the controller 3, the automatic transmission 2, etc. Further in other input device 15 may be separated from control device such as a smart phone, tablet computer or personal computer and connect with the controller via wireless communication device. The automatic transmission 2 or more generally the bicycle 1 may include a crankshaft 16 configured to receive pedaling input from a rider. The crankshaft 16 is configured to transfer rotational energy to the speed stages 14. A shifting device 17 (e.g., derailleur) may also be provided in the automatic transmission 2 to enable shifting operation between the plurality of speed stages 14. Therefore, the shifting device 17 may be coupled to the speed stages 14 in one example. Furthermore, the shifting device 17 may be configured to receive shifting commands from the controller 3. In this way, the controller 3 can instruct the automatic transmission 2 to downshift and upshift between speed stages 14 through operation of the shifting device 17.

It will be appreciated that the bicycle 1 may include additional parts, components, etc., which are commonly included in bicycles such as a front and rear wheel, a frame, a brake system, etc.

Figure 2:
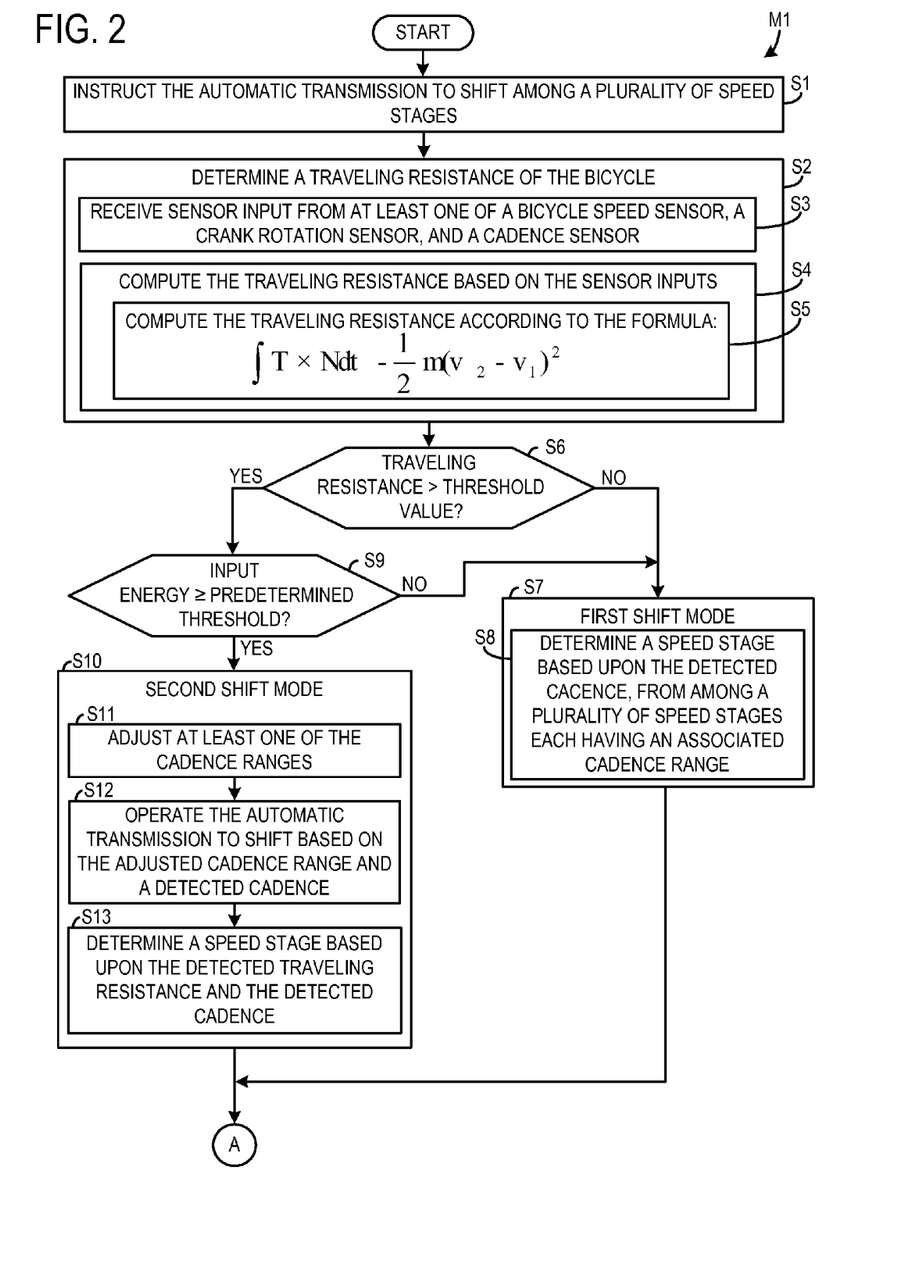
FIGS. 2 and 3 show a flowchart of a method for operating an automatic transmission of a bicycle.
Figure 3:
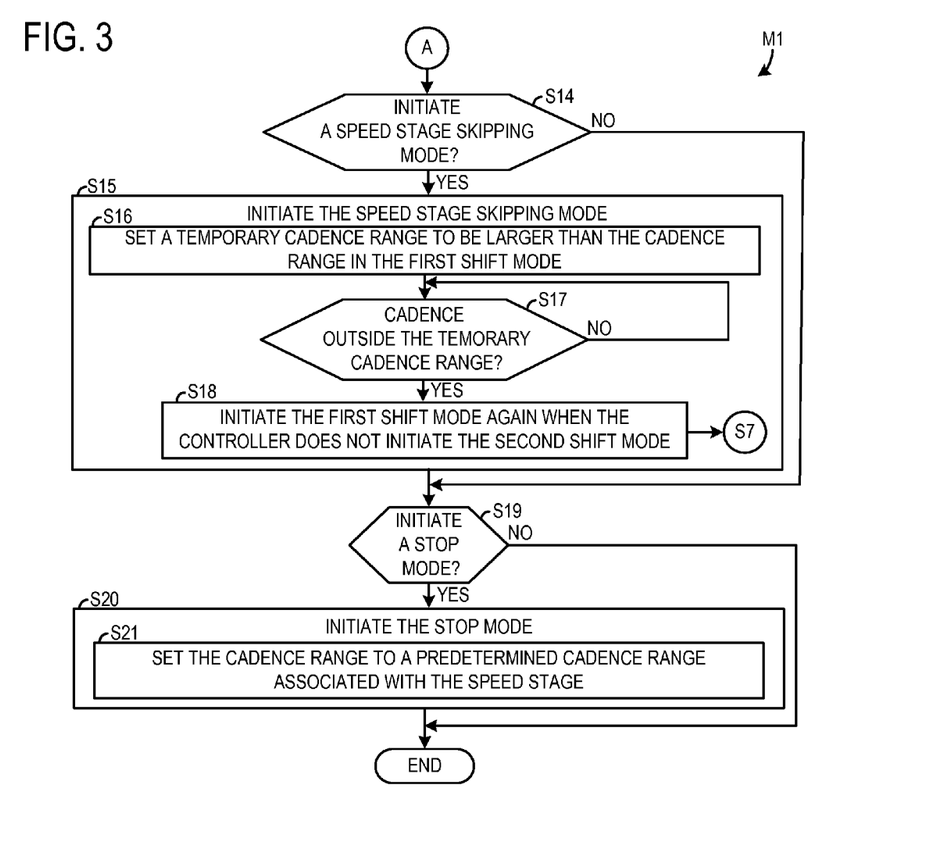

FIGS. 2 and 3 show a method M1 for operating an automatic transmission for a bicycle. The control device 10 including the automatic transmission 2 and the controller 3 shown in FIG. 1 may be used to implement the method M1 as well as the methods M2, M3, M4, M5, M6, and M7 described in greater detail herein. Specifically, the controller 3, shown in FIG. 1, may be configured to implement the method steps described herein. However, in other embodiments other suitable control devices with automatic transmission, controllers, etc., may be used to implement the method steps described herein.

At S1 the method includes instructing the automatic transmission to shift among a plurality of speed stages. Each of the speed stages has an associated cadence range. Shifting among a plurality of speed stages may include altering a speed stage (e.g., gear ratio) in the automatic transmission via one or more shifting devices such as a derailleur (e.g., front and/or rear derailleur) or an internal gear hub. However, numerous suitable shifting devices have been contemplated. Further in one embodiment, the automatic transmission may have a plurality of discrete speed stages (e.g., discrete gear ratios). For instance, the speed stages may include a selected front sprocket and/or rear sprocket. However, in other embodiments the speed stages in the automatic transmission may be continuously adjustable.

Next at S2 the method includes determining a traveling resistance of the bicycle. Determining the traveling resistance of the bicycle may include steps S3-S4. At S3 the method includes receiving sensor input from at least one of a bicycle speed sensor, a crank rotation sensor, and a cadence sensor. In one embodiment, sensor inputs may be received from all of the aforementioned sensors. In this way, bicycle speed, crank speed, and bicycle cadence can be detected. At S4 the method includes computing the traveling resistance based on the sensor inputs. Computing the traveling resistance based on the sensor inputs may include step S5.

At S5 the method includes computing the traveling resistance according to the formula:

$$\int T \times N dt - \frac{1}{2} m (v_2 - v_1)^2 \qquad (1)$$

wherein
T=torque;
N=number of crankshaft rotations (per unit time);
m=mass of the bicycle and a rider; and
v=bicycle speed
However, other suitable equations which may model the traveling resistance can be used to determine the traveling resistance, in other embodiments.

At S6 the method includes determining if the traveling resistance of the bicycle is greater than a threshold value. In other embodiments, other techniques may be used to determine shift mode selection rather than a traveling resistance threshold. For instance, cadence and/or speed may be used to determine shift mode selection, in other embodiments.

If it is determined that the traveling resistance is greater than the threshold value (YES at S6) the method advances to S7. At S7 the method includes implementing a first shift mode. In the first shift mode the method includes at S8 determining a speed stage based upon the detected cadence, from among the plurality of speed stages each having an associated cadence range. Thus, in the first shift mode travelling resistance may not be taken into account due to the fact that the resistance may not have a noticeable effect on bicycle pedaling operation. In one embodiment, the cadence ranges of at least two of the speed stages are the same or overlap. Having overlapping speed stages may increase the likelihood of smooth shifting operation. However, in other embodiments the speed stages may not overlap. Further in one embodiment, in the first shift mode, the cadence range for at least one of the speed stages is determined based upon a target cadence. In such an embodiment, the target cadence may be user programmable, in one example. For instance, a rider may user an input device to programmatically select a target cadence. In this way, a rider can select a desirable target cadence, thereby increasing the transmission's adaptability. However in other examples, the target cadence may be automatically determined by the controller without user input.

If it is determined that the traveling resistance is less than the threshold value (NO at S6) the method advances to S9. At S9 the method includes determining if an input energy to the automatic transmission is greater than or equal to a predetermined threshold. In other embodiments, step S9 may be omitted from the method M1. If it is determined that the input energy is not greater than or equal to the predetermined threshold (NO at S9) the method proceeds to S7. However, if it is determined that the input energy is greater than or equal to the predetermined threshold (YES at S9) the method advances to S10.

At S10 the method includes implementing a second shift mode. In second shift mode the method includes at S11 the method includes adjusting at least one of the cadence ranges. In one embodiment, the cadence ranges may be adjusted by predetermined values. For instance, the upper and/or lower limit of the cadence range may be altered in a stepwise fashion by predetermined revolutions per minute (rpm). Adjusting the cadence ranges can enable pedaling efficiency to be increased and also may allow for improved shifting operation (e.g., smoother shifting operation).

Next at S12 the method includes operating the automatic transmission to shift based on the adjusted cadence range and a detected cadence.

Next at S13 determining a speed stage based upon the detected traveling resistance and the detected cadence is performed. In this way, speed stage selection can be improved by taking into account multiple variables. Consequently, pedaling efficiency can be increased and shifting operation can be improved. In one embodiment, the first shift mode may be a normal mode and the second shift mode may be a high load mode. However, other types of modes have been contemplated.

Now referring to FIG. 3, at step S14 the method determines if a speed stage skipping mode should be initiated. Entry condition may be used to determine speed stage skipping mode implementation, such as the controller 3 receives a shift signal from the input device 15.

If it is determined that the speed stage skipping mode should be initiated (YES at S14) the method advances to S15. At S15 the method includes initiating the speed stage skipping mode. Initiating the speed stage skipping mode may include steps S16-S18. At S16 the method includes setting a temporary cadence range to be larger than the cadence range in the first shift mode. At S17 the method includes determining if the cadence is outside the temporary cadence range. If the cadence is not outside the temporary cadence range (NO at S17) the method returns to S17. However, if the cadence is outside the temporary cadence range (YES at S17) the method advances to S18. At S18 the method includes initiating the first shift mode again when the controller does not initiate the second shift mode. Therefore, at S18 the method can return to S7 if the second shift mode is not initiated, as indicated. However, if the second shift mode is initiated the method can return to S12.

At S19 the method includes determining if a stop mode should be initiated. It will be appreciated that the stop mode may be initiated based on the speed of the bicycle. For instance, the stop mode may be initiated when the speed of the bicycle is less than a threshold value or, in one specific example, substantially zero.

If it is determined that the stop mode should not be initiated (NO at S19) the method ends, and typically returns to a state in which the method may be commenced again at S1. However, if it is determined that the stop mode should be initiated (YES at S19) the method proceeds to S20. At S20 the method includes initiating the stop mode. Initiating the stop mode may include at S21 setting the cadence range to a predetermined cadence range associated with the speed stage. In this way, a speed stage which enables a rider to quickly accelerate from a stop can be selected, to improve bicycle operation, for instance.

Figure 4:
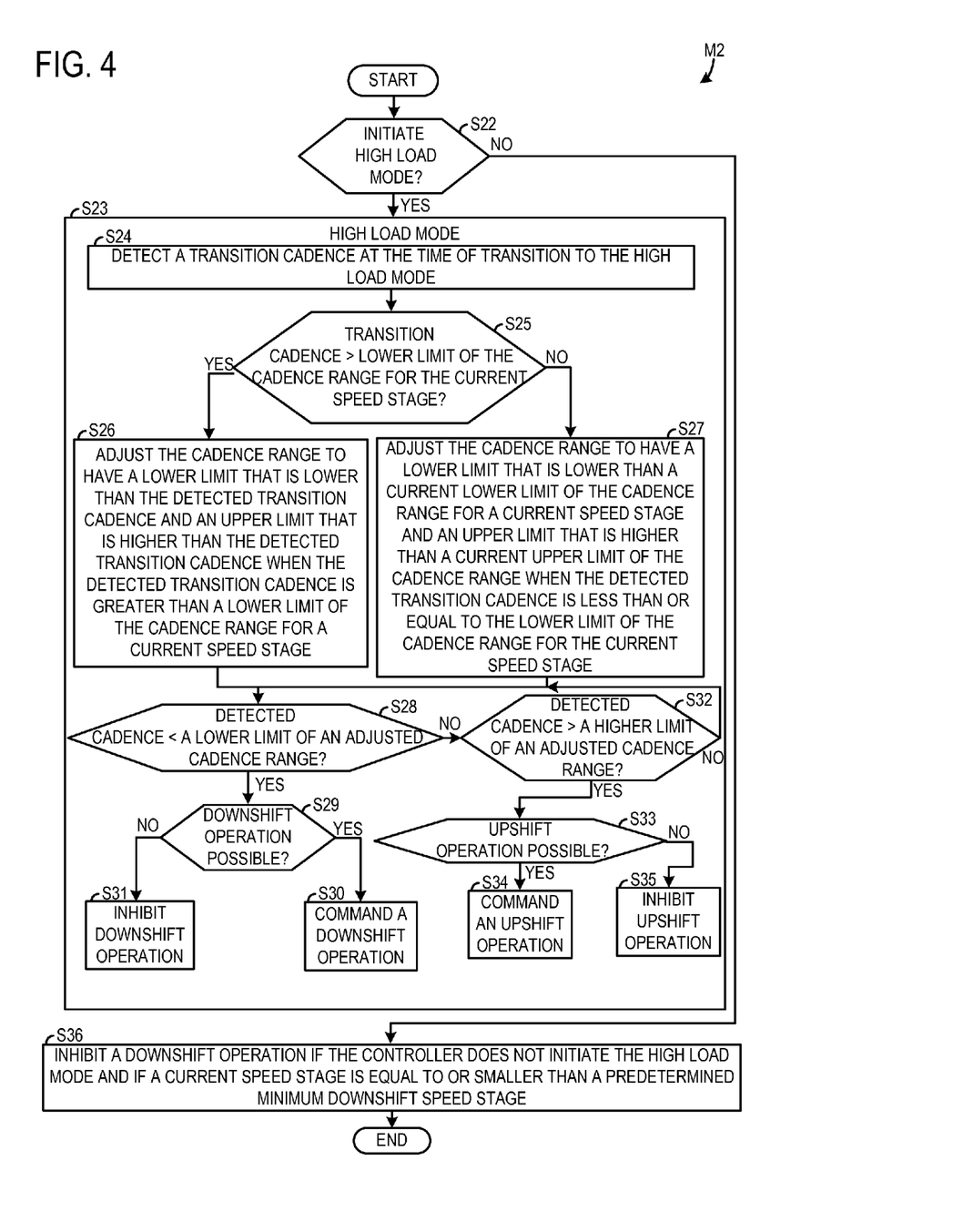
FIG. 4 shows a flowchart of a method for operation an automatic transmission in a high load mode.

FIG. 4 shows a method M2 detailing a specific technique for implementing a high load mode. As described above with regard to the method M1 illustrated in FIGS. 2 and 3, the second shift mode may be a high load mode.

At S22 the method includes determining if a high load mode should be initiated. In one embodiment, the high load mode may be initiated based on a traveling resistance and/or input energy of the bicycle, as described with regard to the method M1.

If it is determined that the high load mode should be initiated (YES at S22) the method proceeds to S23. At S23 the method includes implementing a high load mode. Implementing the high load mode S23 may include steps S24-S36. At S24 the method includes detecting a transition cadence at the time of transition to the high load mode. It will be appreciated that a high load mode transition may include a time period prior to the step of determining a speed stage based upon a detected traveling resistance and a detected cadence.

At S25 the method determines if a transition cadence is greater than a lower limit of the cadence range for the current speed stage. If it is determined that the transition cadence is greater than the lower limit of the cadence range for the current speed stage (YES at S25) then the method proceeds to S26. At S26 the method includes adjusting the cadence range to have a lower limit that is lower than the detected transition cadence and an upper limit that is higher than the detected transition cadence when the detected transition cadence is greater than a lower limit of the cadence range for a current speed stage.

However, if it is determined that the transition cadence is not greater than the lower limit of the cadence range for the current speed stage (NO at S25) then the method proceeds to S27. At S27 the method includes adjusting the cadence range to have a lower limit that is lower than a current lower limit of the cadence range for a current speed stage and an upper limit that is higher than a current upper limit of the cadence range when the detected transition cadence is less than or equal to the lower limit of the cadence range for the current speed stage. At S28 the method determines if the detected cadence falls below a lower limit of an adjusted cadence range.

If the detected cadence does not fall below the lower limit of an adjusted cadence range (NO at S28) the method moves to S32. However, if the detected cadence falls below the lower limit of an adjusted cadence range (YES at S28) the method proceeds to S29.

At S29 the method includes determining whether a downshift operation is possible. If it is determined that downshift operation is possible (YES at 29) the method proceeds to S30. If present speed state is not a predetermined minimum speed stage, the downshift operation is possible. At S30 the method includes commanding a downshift operation. However, if it is determined that downshift operation is not possible (NO at 29) the method proceeds to S31. At S31 the method includes inhibiting downshift operation.

At S32 the method determines if the detected cadence is greater than a higher limit of an adjusted cadence range. If the detected cadence is not greater than the higher limit of the adjusted cadence range (NO at S32) the method returns to S28. However, if the detected cadence is greater than the higher limit of the adjusted cadence range (YES at S32) the method advances to S33.

At S33 the method includes determining whether an upshift operation is possible. If it is determined that upshift operation is possible (YES at 33) the method proceeds to S34. At S34 the method includes commanding an upshift operation. However, if it is determined that upshift operation is not possible (NO at S33) the method proceeds to S35. If present speed state is not a predetermined maximum speed stage, the downshift operation is possible. At S35 the method includes inhibiting downshift operation.

However, if it is determined that the high load mode should not be initiated (NO at S22) the method advances to S36. At S36 the method includes inhibiting a downshift operation if the controller does not initiate the high load mode and if a current speed stage is equal to or smaller than a predetermined minimum downshift speed stage. In one embodiment, the predetermined minimum downshift speed stage is determined according to a user setting.

Figure 5:
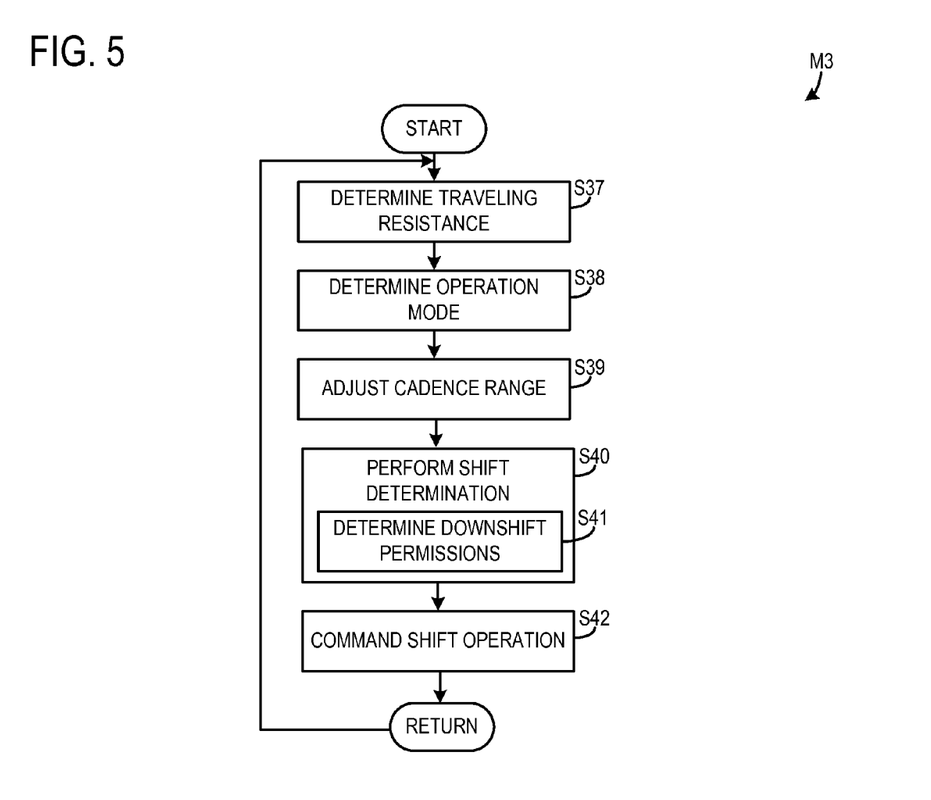
FIG. 5 shows a flowchart of a method for operating an automatic transmission in a bicycle to perform shift mode selection and shift operation.

FIG. 5 shows a method M3 for controlling shift operation in a control device of a bicycle. At S37 the method includes determining a traveling resistance. As previously discussed the travelling resistance can be determined using equation (1). Next at S38 the method includes determining mode operation. As previously discussed, the modes of operation may include a first shift mode (e.g., a normal mode), a second shift mode (e.g., a high load mode), a stop mode, and/or a speed stage skipping mode. The shift mode can be selected based on the traveling resistance, bicycle speed, and/or input energy.

Next at S39 the method includes adjusting a cadence range. The cadence range can be adjusted based on the mode selected in S38. In this way, the cadence range can be changed based on the traveling resistance to improve shifting operation. For instance, it may be desirable to increase the breadth of the cadence ranges (e.g., expand the upper and/or lower cadence limits) in various operation modes to inhibit unwanted shift operation while a rider is exerting a large amount of energy. However, in other examples, the breadth of the cadence ranges may be decreased.

In one embodiment, when the first shift mode is selected the cadence range may not be adjusted. At S40 the method includes determining shift operation which may include at step S41 determining downshift permissions. However it will be appreciated that upshift permission may also be determined. At S42 the method includes commanding shift operation. It will be appreciated that the automatic transmission may shift in this manner without user input requesting shift operation.

Figure 6:
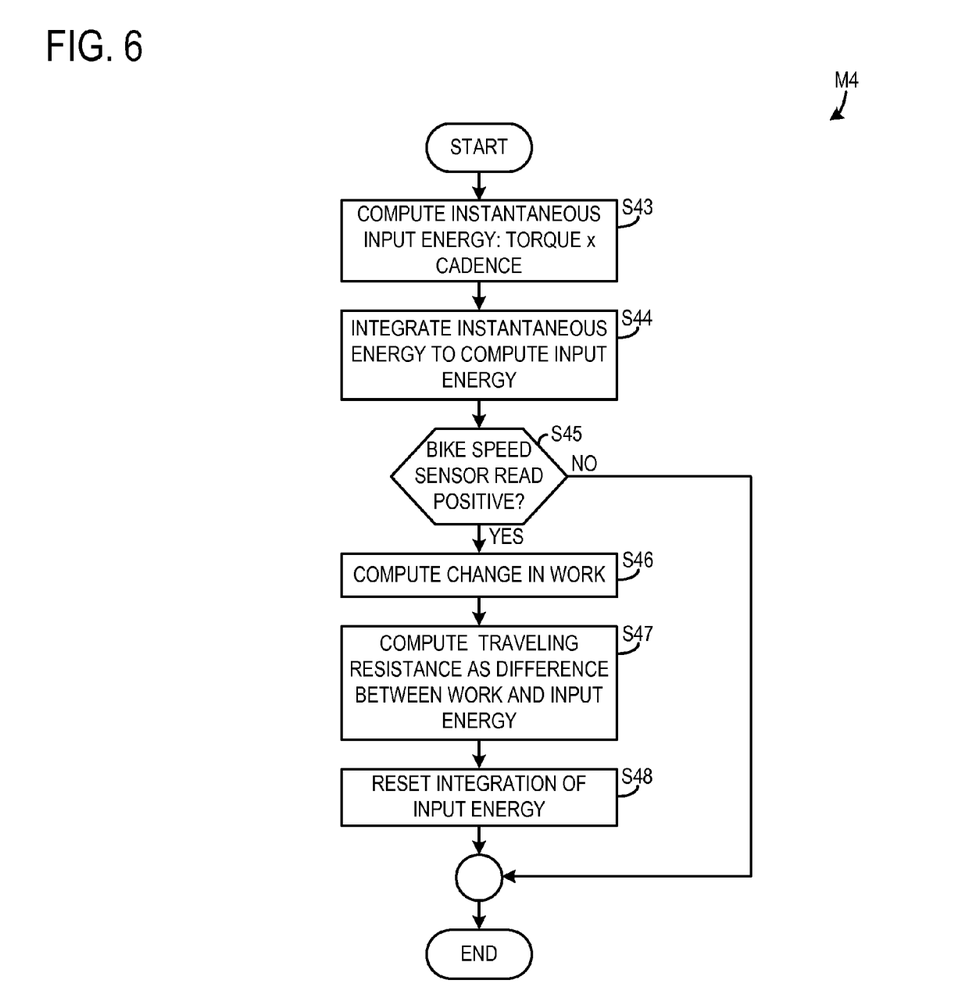
FIG. 6 shows a flowchart of a method for determining traveling resistance.

FIG. 6 shows a detailed method M4 showing a way to determine the traveling resistance. However, numerous methods for determining traveling resistance have been contemplated.

At S43 the method includes computing instantaneous input energy. Next at S44 the method includes integrating instantaneous energy to compute input energy. At S45 the method includes determining if there is a positive bicycle speed sensor reading. If it is determined that there is not a positive bicycle speed sensor reading (NO at S45) the method ends. However, if it is determined that there is a positive bicycle speed sensor reading (YES at S45) the method advances to S46. At S46 the method includes computing the change in work.

At S47 the method includes computing traveling resistance as difference between work and input energy. In this way, the traveling resistance can be accurately determined to when using the traveling resistance to determine shift mode selection. Next at S48 the method includes resetting integration of input energy.

Figure 7:
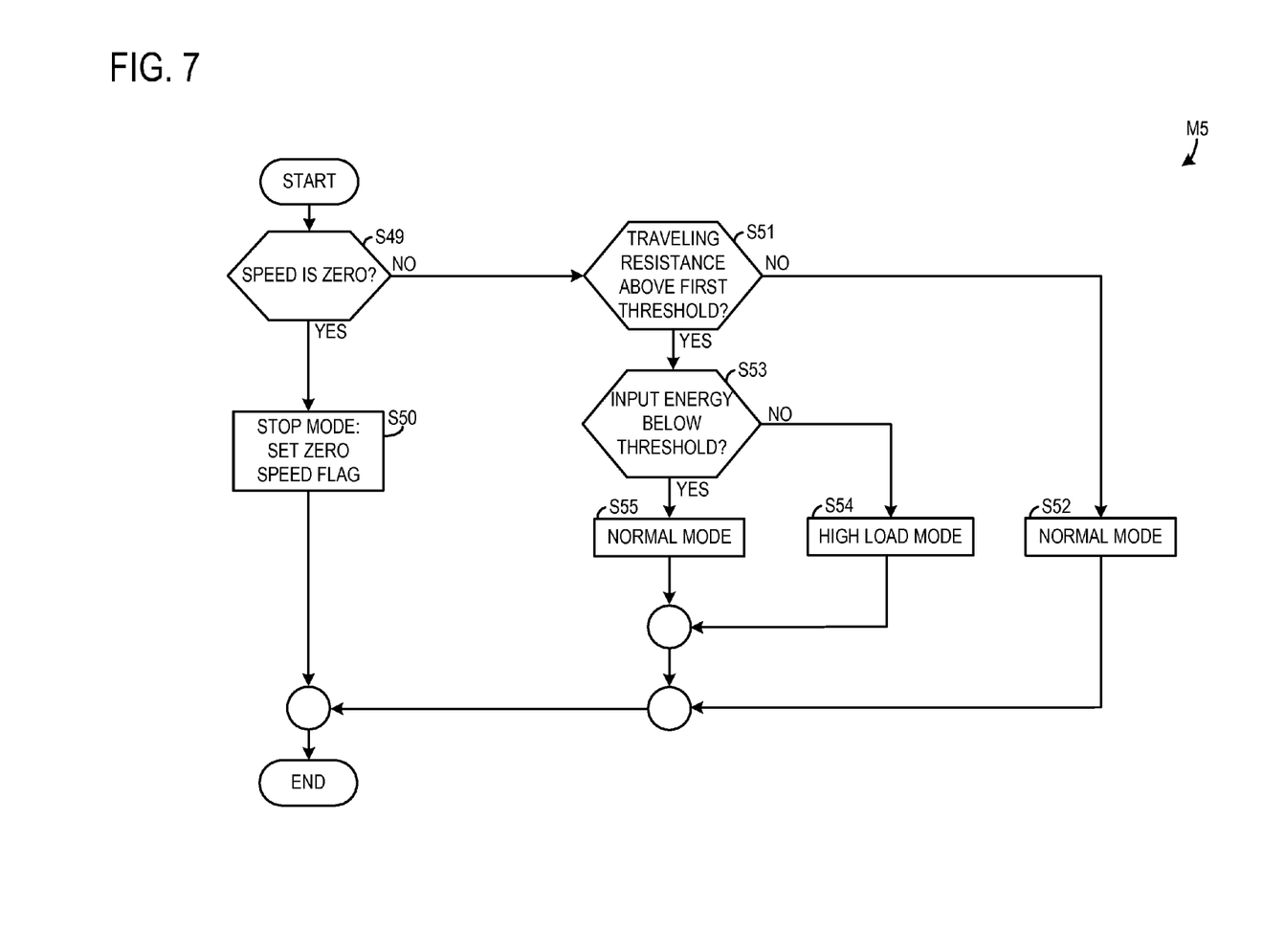
FIG. 7 shows a detailed flowchart of a method for performing shift mode selection in an automatic transmission of a bicycle.

FIG. 7 shows a detailed method M5 showing a shifting mode selection technique. At S49 the method includes determining if the bicycles speed is zero. If the bicycle speed is zero (YES at S49) the method proceeds to S50. At S50 the method includes initiating a stop mode by setting a zero speed flag.

However, it the bicycle speed is not zero (NO at S49) the method advances to S51. At S51 the method includes determining if the traveling resistance is above a first threshold. If the traveling resistance is not above the first threshold (NO at S51) the method advances to S52. At S52 the method includes implementing a normal mode. As previously discussed, in the normal mode a speed stage may be determined based on the detected cadence.

However, if the traveling resistance is above the first threshold (YES at S51) the method advances to S53. At S53 the method includes determining if an input energy is below a threshold. If it is determined that the input energy is not below the threshold (NO at S53) the method proceeds to S54. At S54 the method includes implementing a high load mode.

As previously discussed, in the high load mode a speed stage may be determined based on the detected traveling resistance and detected cadence. However, if it is determined that the input energy is below the threshold (YES at S53) the method proceeds to S55. At S55 the method includes implementing a normal mode. Method M5 enables both traveling resistance and input energy to be taken into account during shifting mode selection to improve shifting operation.

Figure 8:
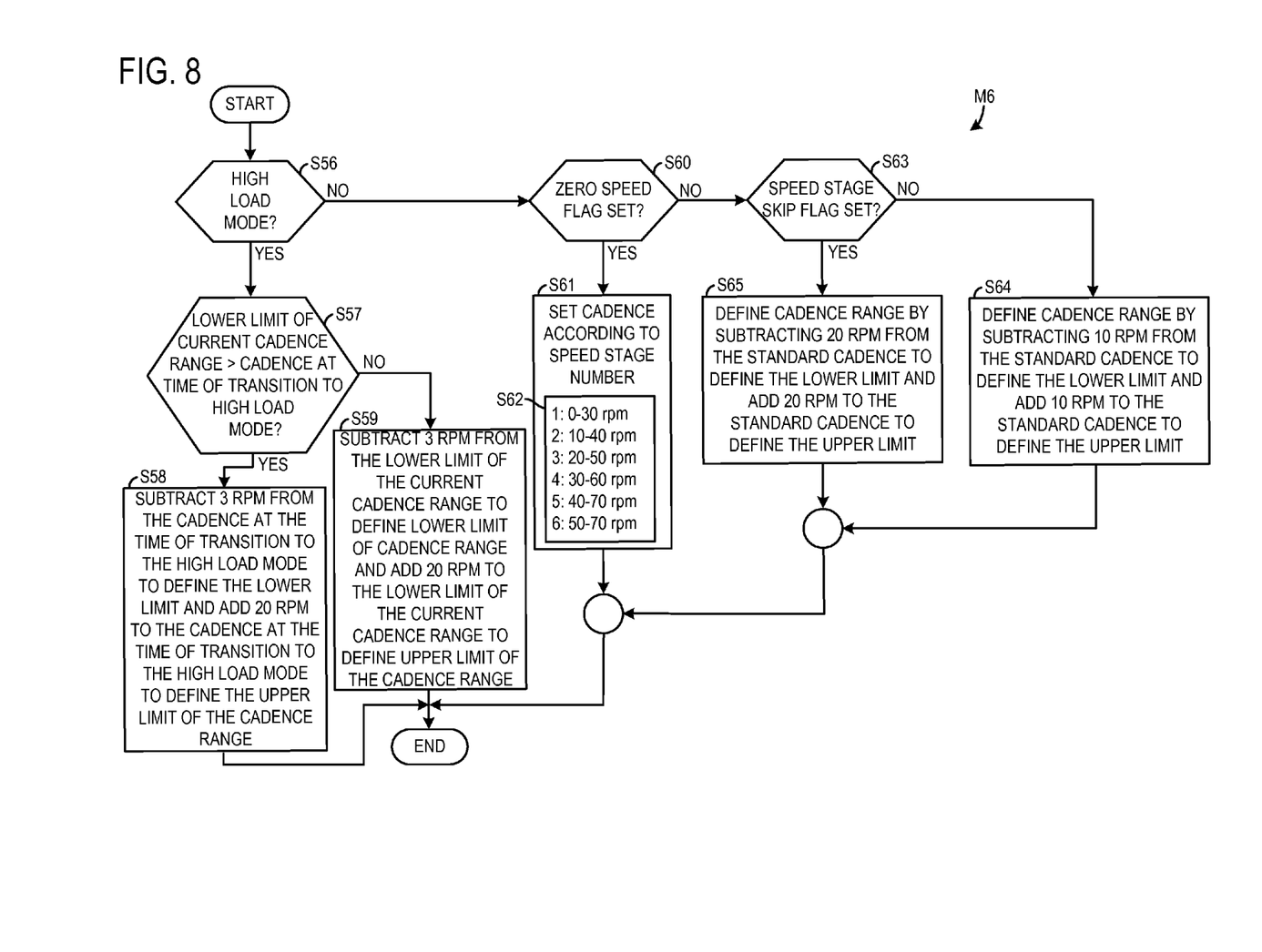
FIG. 8 shows another detailed flowchart of a method for performing shift mode selection in an automatic transmission of a bicycle.

FIG. 8 shows a detailed method M6 showing a shifting mode selection technique. At S56 the method includes determining if a high load mode should be implemented. If it is determined that the high load mode should be implemented (YES at 56) the method advances to S57. At S57 the method determines if the lower limit of a current cadence range is greater than a cadence at the time of transition to high load mode.

If it is determined that the lower limit of the current cadence range is greater than the cadence at the time of transition to the high load mode (YES at S57) the method advances to S58. At S58 the method includes subtracting 3 rpm from the cadence at the time of transition to the high load mode to define the lower limit of the cadence range and adding 20 rpm to the cadence at the time of transition to the high load mode to define the upper limit of the cadence range.

However, if it is determined that the lower limit of the current cadence range is not greater than the cadence at the time of transition to the high load mode (NO at S57) the method advances to S59. At S59 the method includes subtracting 3 rpm from the lower limit of the current cadence range to define the lower limit of the cadence range and adding 20 rpm to the lower limit of the current cadence range to define the upper limit of the cadence range. It will be appreciated that the magnitude of cadence range adjustment described in S58 and S59 are exemplary in nature and other suitable cadence range adjustment values can be used in other embodiments.

If it is determined that the high load mode should not be initiated (NO at S56) the method advances to S60. At S60 the method includes determining if a zero speed flag is set. The zero speed stage flag may be set when the bicycle speed is less than a predetermined value or substantially zero.

If a zero speed flag is set (YES at S60) the method proceeds to S61 which includes setting cadence according to speed stage number. Exemplary cadence ranges and associated speed stages are depicted at S62. However, numerous additional or alternate speed stages and associated cadence ranges have been contemplated.

If it is determined that the zero speed stage flag is not set (NO at S60) the method advances to S63. At S63 the method includes determining if the speed stage skip flag is set. If it is determined that the speed stage skip flag is not set (NO at S63) the method proceeds to S64. At S64 the method includes defining cadence range by subtracting 10 rpm from the standard cadence to define the lower limit and adding 10 rpm to the standard cadence to define the upper limit. The standard cadence may be user programmable, in one embodiment. Furthermore, the initial standard cadence may be a predetermined value such as 60 rpm, for instance.

However, if it is determined that the speed stage skip flag is not set (YES at S63) the method proceeds to S65. At S65 the method includes defining cadence range by subtracting 20 rpm from the standard cadence to define the lower limit and adding 20 rpm to the standard cadence to define the upper limit. It will be appreciated that the cadence range adjustments in steps S64 and S65 are exemplary in nature and numerous cadence range adjustment degrees have been contemplated. The method M6 enables the cadence range of a current speed stage to be adjusted based on various operating conditions in the bicycle to improve shifting operation through an increase in the boundaries of the cadence range to prevent unwanted shifting during selected periods of bicycle operation.

Figure 9:
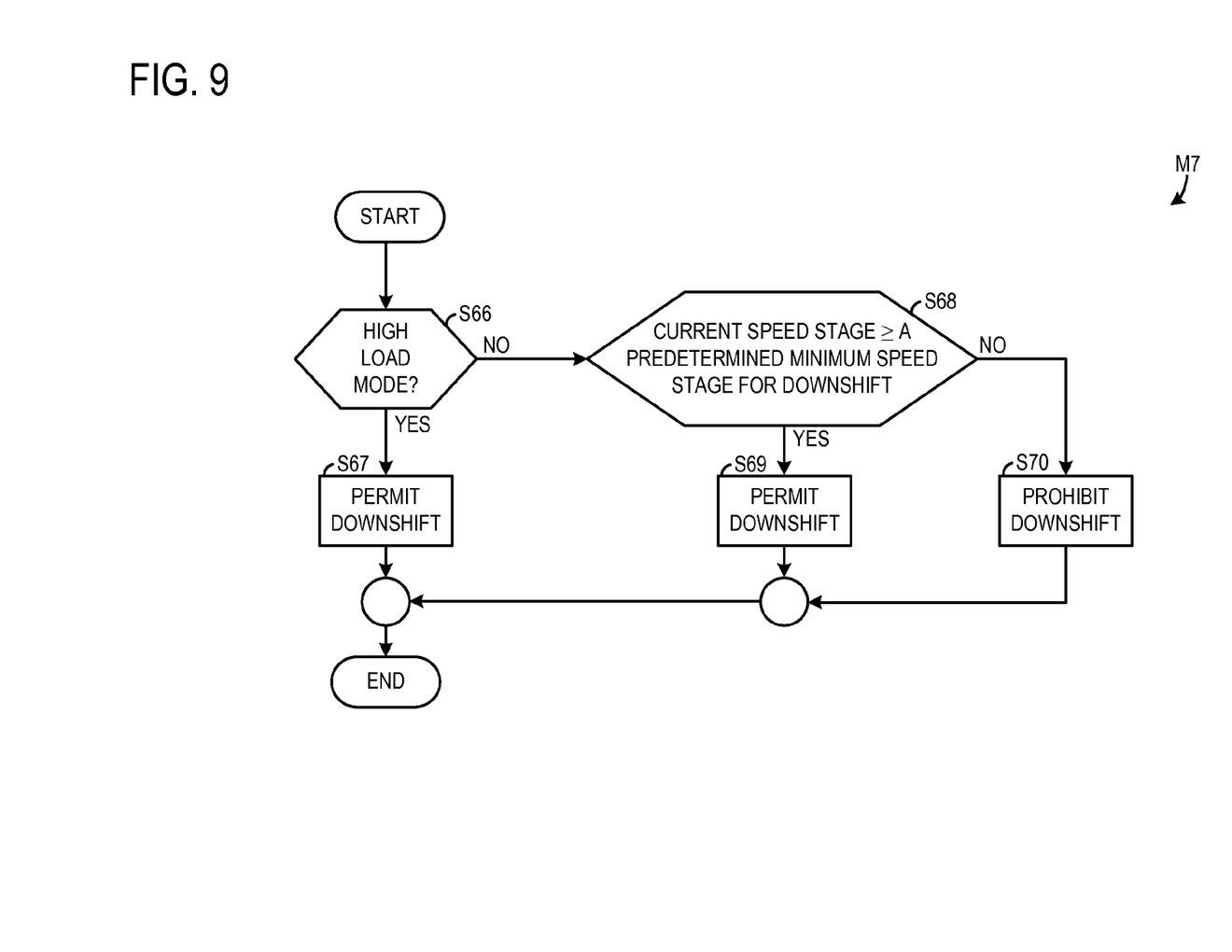
FIG. 9 shows a detailed flowchart of a method for performing shifting operation in an automatic transmission.

FIG. 9 shows a detailed method M7 showing shifting operation. At S66 the method determines if the high load mode is selected. If it is determined that the high load mode is selected (YES at S66) the method proceeds to S67. At S67 the method includes permitting downshift operation. It will be appreciated that a downshift includes an operation in the automatic transmission where a lower gear is selected by a shifting device, such as a derailleur, for instance.

Figure 10:
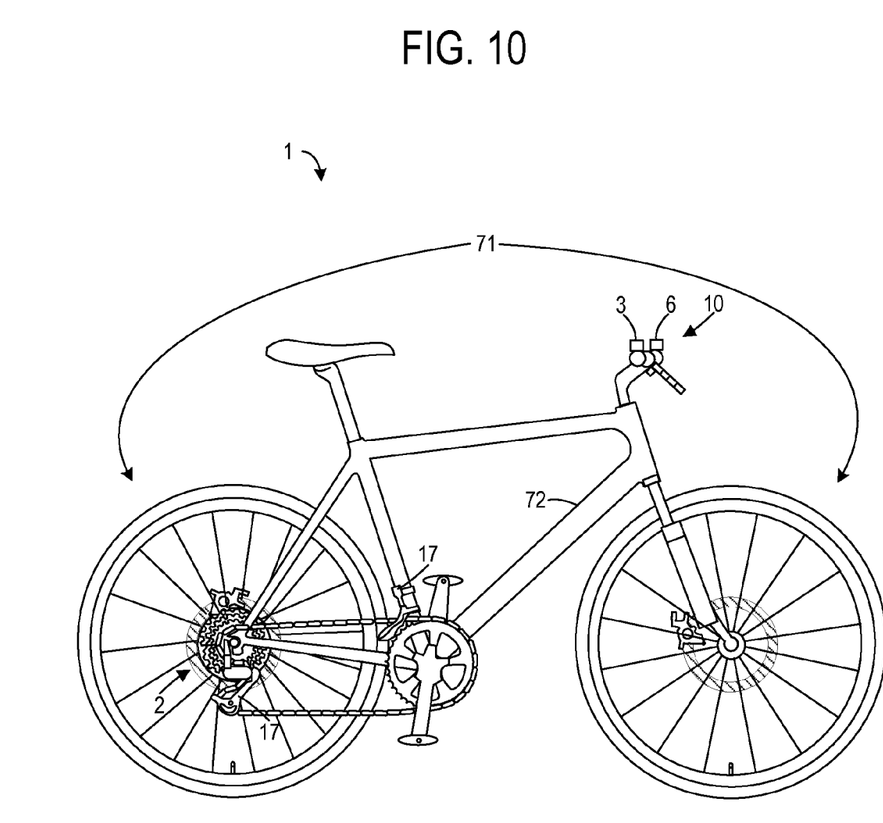
FIG. 10 shows a side view of one example configuration of the example bicycle of FIG. 1.

However, if it is determined that the high load mode is not selected (NO at S66) the method proceeds to S68. At S68 the method includes determining if a current speed stage is greater than or equal to a predetermined minimum speed stage for downshift. If it is determined that the current speed stage is greater than or equal to the predetermined minimum speed stage for downshift (YES at S68) the method proceeds to S69. At S69 the method includes permitting downshift operation. However, if it is determined that the current speed stage is not greater than or equal to the predetermined minimum speed stage for downshift (NO at S68) the method proceeds to S70. At S70 the method includes prohibiting downshift operation. Method M7 enables downshift to be performed when a high load mode is implemented and when the speed stage is greater than a minimum speed stage to decrease the amount of energy a rider needs to exert on the crankshaft. As a result, pedaling efficiency can be increased and rider fatigue can be reduced. FIG. 10 shows a side view of the example bicycle 1, which has been shown schematically in FIG. 1. The control device 10 including the controller 3 and the input device 6 is also shown in FIG. 10. Additionally, the automatic transmission 2 having the shifting device 17 (e.g., front and rear derailleur) is also depicted. As previously discussed, the controller 3 may command the shifting device 17 to adjust the speed stage in the automatic transmission. The bicycle further includes wheels 71 and a frame 72.

The term "comprising" and its derivatives, as used herein, are intended to be open ended terms that specify the presence of the stated features, elements, components, groups, integers, and/or steps. This concept also applies to words of similar meaning, for example, the terms "have", "include" and their derivatives.

The terms of degree such as "approximately" as used herein mean a reasonable amount of deviation of the modified term such that the end result is not significantly changed (e.g., manufacturing tolerances).

While specific embodiments of the bicycle and control device have been described in detail, the particular arrangements disclosed are meant to be illustrative only and not limiting. The features of the various embodiments described above, as well as modifications thereof, may be variously combined without departing from the scope of this disclosure.

The invention claimed is:

1. A control device for an automatic transmission for a bicycle, comprising:
    a controller configured to instruct the automatic transmission to shift among a plurality of speed stages, each speed stage having an associated cadence range;
    wherein the controller is further configured to determine a traveling resistance of the bicycle, and if the traveling resistance exceeds a predetermined threshold, the controller is configured to adjust at least one of the cadence ranges; and
    following the adjustment of the at least one cadence range, the controller is further configured to operate the automatic transmission to shift based upon the adjusted cadence range and a detected cadence.

2. The control device of claim 1, wherein the controller is configured to receive sensor inputs from at least one of a bicycle speed sensor, a crank rotation speed sensor, and a cadence sensor, and compute the traveling resistance based upon the sensor inputs.

3. The control device of claim 2, wherein the controller is configured to compute the traveling resistance according to the formula:

$$\int T \times N dt - \frac{1}{2} m (v_2 - v_1)^2$$

wherein
    T=torque;
    N=number of crankshaft rotations (per unit time);
    m=mass of the bicycle and a rider; and
    v=bicycle speed.

4. The control device of claim 1, wherein the controller is further configured to:
    in a first shift mode, determine a speed stage based upon the detected cadence, from among the plurality of speed stages; and
    in a second shift mode, determine a speed stage from among the plurality of speed stages based upon the detected traveling resistance and the detected cadence.

5. The control device of claim 4, wherein the first shift mode is a normal mode which is applied when the traveling resistance does not exceed the predetermined threshold, and the second shift mode is a high load mode which is applied when the traveling resistance exceeds the predetermined threshold.

6. The control device of claim 4, wherein the cadence ranges for at least two of the speed stages are the same or overlap.

7. The control device of claim 4, wherein, in the first shift mode, the cadence range for at least one of the speed stages is determined based upon a target cadence.

8. The control device of claim 4, wherein, in the first shift mode, a target cadence is programmable by a user.

9. The control device of claim 4, wherein the controller is further configured to initiate a speed stage skipping mode in which a temporary cadence range is set to be larger than the cadence range in the first shift mode and if the cadence becomes outside of the temporary cadence range in the speed stage skipping mode, the controller initiates the first shift mode again when the controller does not initiate the second shift mode.

10. The control device of claim 4, wherein the controller is further configured to initiate a stop mode when a bicycle speed is detected to be substantially zero, and wherein in the stop mode the cadence range is set to be a predetermined one of the cadence ranges associated with one of the plurality of speed stages.

11. The control device of claim 4, wherein the controller is further configured to initiate a high load mode when input energy meets or exceeds a predetermined threshold.

12. The control device of claim 11, wherein, the controller is further configured to detect a transition cadence at the time of transition to the high load mode, and configured to adjust the at least one cadence range to have a lower limit that is lower than the detected transition cadence and an upper limit that is higher than the detected transition cadence when the detected transition cadence is greater than a lower limit of the cadence range for a current speed stage of the plurality of speed stages.

13. The control device of claim 11, wherein, the controller is further configured to detect a transition cadence at the time of transition to the high load mode, and configured to adjust the at least one cadence range to have a lower limit that is lower than a current lower limit of the cadence range for a current speed stage of the plurality of speed stages and an upper limit that is higher than a current upper limit of the at least one cadence range when the detected transition cadence is less than or equal to the lower limit of the cadence range for the current speed stage.

14. The control device of claim 11,
wherein when the detected cadence falls below a lower limit of an adjusted cadence range in the high load mode, the controller is configured to determine whether a downshift is possible, and if possible, to command a downshift operation; and
wherein the controller is further configured to inhibit a downshift operation if the controller does not initiate the high load mode and if a current speed stage is equal to or smaller than a predetermined minimum downshift speed stage of the plurality of speed stages.

15. The control device of claim 14, wherein the predetermined minimum downshift speed stage is determined according to a user setting.

\* \* \* \* \*